Feb. 23, 1954 F. R. HORMANN 2,669,753
METHOD OF PRODUCING RUBBER COVERED VALVE
STEM WITH COMPENSATING BUSHING
Filed March 2, 1950
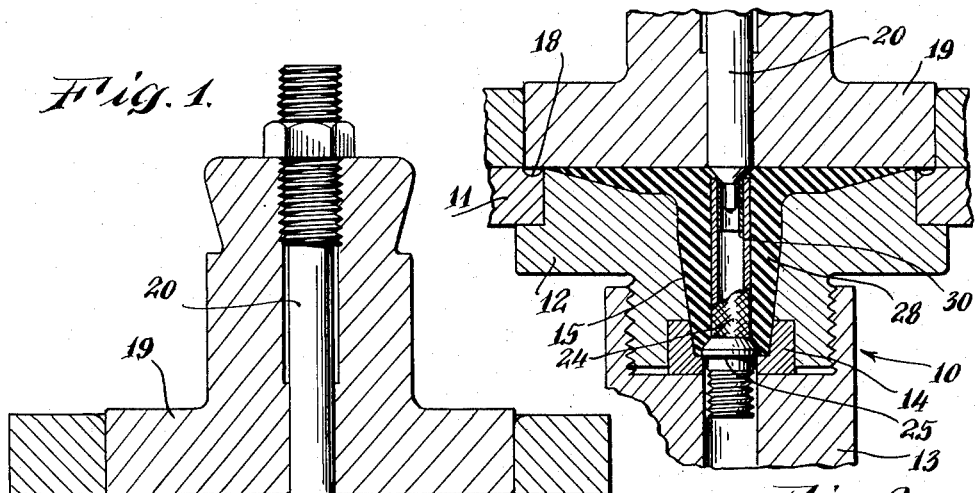
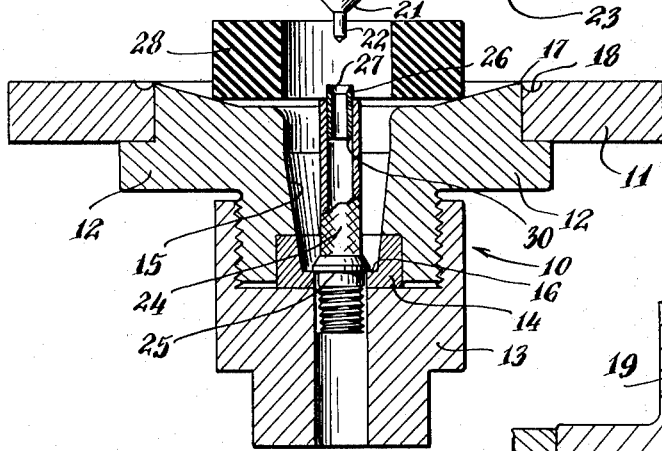
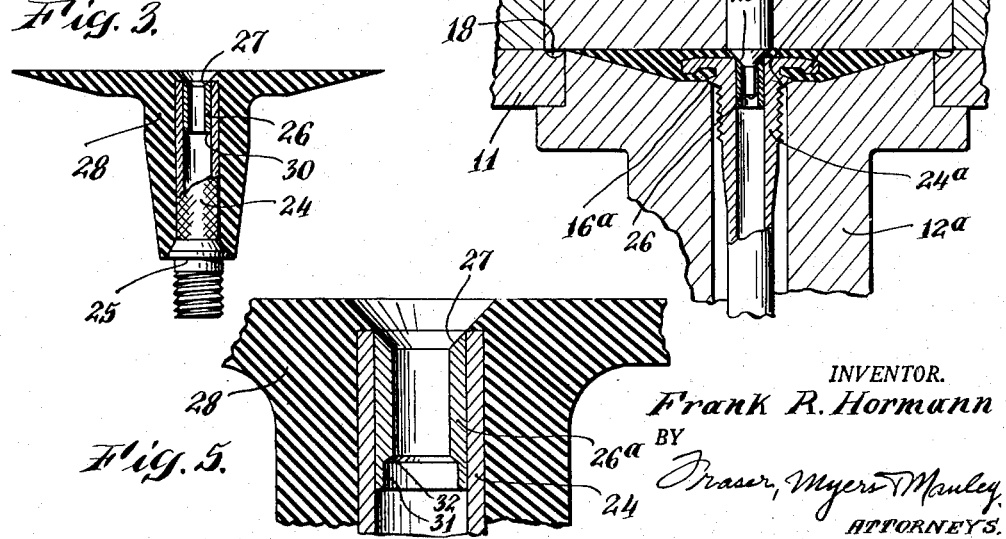
INVENTOR.
Frank R. Hormann
BY
Fraser, Myers & Manley
ATTORNEYS.

Patented Feb. 23, 1954

2,669,753

UNITED STATES PATENT OFFICE 2,669,753

METHOD OF PRODUCING RUBBER COVERED VALVE STEM WITH COMPENSATING BUSHING

Frank R. Hormann, Brooklyn, N. Y., assignor to Scovill Manufacturing Company, Waterbury, Conn., a corporation of Connecticut Application March 2, 1950, Serial No. 147,220

4 Claims. (Cl. 18—59)

The present invention relates to tire valve stems of the type comprising a metal stem provided at one end with a rubber base flange by means of which the valve stem is adapted to be attached to a tire tube by vulcanization or the like.

In the course of attaching a rubber base flange to a metal valve stem, the stem is inserted into a mold cavity with a rubber slug and, as the mold closes, the mold pin engages the end of the stem to seal off the opening therein, the slug flows around the stem and fills the mold cavity and the thickness of the rubber base flange is determined by the extent to which the mold pin, which is adjustable, protrudes beyond the mold closing plate. In manufacturing operations, however, some slight variations in the length of the metal valve stems may occur and because of such variations and the fact that the mold pin may wear and the mold may have become warped, there is ever present the danger that the rubber base flanges will not be uniform. For example, in extreme cases where the valve stem is too short for contact with the mold pin, rubber will find its way into the bore of the stem and must be subsequently removed by a wire brush or the like; where the stem is too long, the mold cover is prevented from fully closing the mold with the result that the base flange is excessively thick and has excessive flash at its peripheral edge which must be trimmed away. Where the stem is too long there is also present the danger of deforming the mold sealing pin.

Accordingly, among the objects of the present invention are the following: (1) to provide a rubber base valve stem wherein the aforementioned shortcomings are obviated; (2) to provide a method of forming rubber base valve stems wherein the tolerances between the cut-off ring and the length of the valve stem above the cut-off ring can be increased; (3) to provide a method of forming valve stems of the character set forth wherein the adjustment of the mold pin may be less accurate than present practice dictates without adversely affecting the resulting product; (4) to provide a method of forming valve stems of the character set forth wherein mold warping and wear does not affect the pinch-off in the mold; (5) to provide a rubber base valve stem wherein maximum diameter of bore may be maintained and the inflating rate through the valve stem thereby increased; (6) to provide a valve stem in which the core drilling machining is simplified, since no recess drill is required; (7) to accomplish the aforementioned objects with but an insignificant additional cost for the resulting improved valve stem.

The foregoing and other objects of the invention not specifically enumerated I accomplish by introducing a slidable, snug-fitting bushing into the bore of the metal valve stem at the end whereat the rubber base flange is to be attached, with a portion of the bushing protruding beyond said end, the bushing being so positioned that when molding the base flange the mold pin will automatically slide the bushing into position as the mold closes to provide, in effect, a valve stem of ideal length for cooperation with the mold. The invention will be better understood from the detailed description which follows, when considered in connection with the accompanying drawings, wherein:

Figure 1 shows a diametrical section through an open mold provided with a valve stem embodying my invention.

Fig. 2 shows a view similar to Fig. 1 with the mold closed.

Fig. 3 shows a diametrical section through a rubber base tire valve stem embodying my invention.

Fig. 4 shows a view similar to Fig. 2 applied to forming a rubber base truck valve stem.

Fig. 5 shows, on an enlarged scale, a form of bushing for use with the valve stem of Fig. 3.

Referring to the drawings, in the various figures of which the same reference characters are employed to designate corresponding parts, there is shown a mold which comprises a main body portion 10 consisting of the assembled parts 11, 12, 13 and 14, the part 12 being formed with a mold cavity 15, a sealing shoulder or pinch cut-off 16 and an annular pinch cut-off edge 17 adjacent which latter the part 11 is formed with an annular groove 18 to accommodate the flash from the mold cavity, and a cover 19 formed with a conventional adjustable mold pin 20, the inner end of which has a tapered shoulder 21 which terminates in a pilot 22. The cover has a flat surface 23 adapted to engage the pinch cut-off 17 to close and complete the mold cavity. The mold may be of any desired construction and mold cavity configuration as the mold per se forms no part of the present invention.

Adapted to be mounted within the mold cavity 15 is a metallic valve stem 24 having a bearing surface or shoulder 25 adapted to seat upon the sealing shoulder 16. The valve stem 24 has a bore therethrough and slidably mounted in the bore at the end of the stem whereat the rubber flange is to be attached is a snug fitting bushing 26 with a portion of said bushing initially protruding beyond said end, the bore at the protruding end of the bushing being preferably tapered as indicated at 27 for complemental engagement by the tapered shoulder 21 on the pilot pin. The seating of the shoulder 21 against the tapered bore portion 27 in the bushing provides a pinch or cut-off which prevents entry of rubber into the bore of the valve stem when the mold closes.

In manufacturing operations some slight variation in the length of the metal valve stem 24 may occur and because of such variations there is ever present the danger that the seal between the shoulders 21 and 27 will not take place to insure rubber base flanges of uniform thickness. For example, in extreme cases where the valve stem is too short for contact with the mold pin the rubber will find its way into the bore of the stem and must be subsequently removed by a wire brush or equivalent means; where the stem is slightly longer than required, the mold cover is prevented from fully closing the mold with the result that the base and flange is excessively thick. However, by employing a bushing such as 26 which normally protrudes beyond the end of the valve stem a sufficient distance to be engaged by the mold pin and provide a seal therewith, the mold pin upon the closing of the cover will force the bushing into the valve stem bore to the correct amount and thereby provide in effect, a valve stem of ideal length for the particular mold.

In forming a rubber covering and base flange on a valve stem such as 24, with the mold equipment as illustrated in Figs. 1 and 2, a valve stem is placed in the mold, a rubber slug 28 is then placed on the top of the mold body overlying the mold cavity, and the mold cover is then brought down into engagement with the mold body. As the mold closes the slug will start to flow but the mold pin will contact and seal off the bore of the bushing 26 before the mold is actually closed. As the mold continues to close, the bushing is forced into the valve stem by the mold pin, its final position being determined by the setting of mold pin which protrudes beyond the flat surface 23 of the cover. The rubber within the mold after being subjected to the proper temperature and pressure for a predetermined period of time becomes vulcanized and firmly attached to the valve stem and the rubber covered valve is then removed from the mold and has the form as shown in Fig. 3.

Where the invention is to be applied to a tire valve stem 24a as shown in Fig. 4, intended for motor trucks, airplane wheels and the like, the rubber base flange is of a character to only encompass the base flange 24b of the valve stem and extend therefrom. Accordingly, the mold cavity is made to conform to the particular valve stem structure or other bored member to which a rubber base flange is to be attached and as shown in Fig. 4 the mold body part 12a is formed with a sealing shoulder 16a for engaging and providing a pinch cut-off with a shoulder 29 formed on the valve stem 24a. Here again, to insure the ideal length for a valve stem for cooperation with the mold pin to provide a flange of proper thickness the rubber base flange-engaging end of the valve stem is provided with a bushing 26 identical in all respects and intended to function in precisely the same manner as the bushing 26 hereinbefore described.

The bushing 26 mounted in the valve stem 24, in addition to providing a means for compensating for variations in the length of the valve stems may be made to serve the additional function of providing a seat for the spring cup support of the conventional or standard "Schrader" valve insides. In this connection the innermost end 30 of the bushing may provide the shoulder for supporting such spring cup. As shown in Fig. 5, I prefer to form the inner end of a bushing 26a with a counterbore 31 to provide a shoulder 32 which will serve as a seat for the spring cup support of a valve insides.

The method of molding a rubber flange on a tubular valve stem of the type shown in Figs. 1 to 3 and the construction of the resulting product possesses the following advantages: it prevents the rubber from gaining access to the bore of the valve stem, thereby eliminating the wire brush thread cleaning and internal rubber cleaning operations; the tolerances between the cut-off shoulder and the length of the stem below such shoulder can be increased; the position of the mold pin in relation to the cover can be allowed to vary within reasonable tolerances; warpage of the mold does not adversely affect the pinch cut-off; more uniformity of rubber base flanges results; a maximum diameter through the valve stem consistent with strength and standard dimensional limitations are possible, thereby insuring faster inflation through the valve stems especially when the long valve insides are used; the core drilling machining is simplified since no recess or offset drilling operations is required thereby decreasing tool costs and insuring better concentricity for the various diameters of the bore. Many of the foregoing advantages also accrue to the type of valve stem shown in Fig. 4.

While I have shown and described certain preferred embodiments of my invention, and the manner in which they are to be carried out, I do not wish to be limited to the specific details of construction shown and described since these may be varied within the range of engineering skill without departing from the spirit of the invention as claimed.

What I claim is:

1. The method of automatically compensating for variations in the length of a bored member in moulding a plastic covering onto one end thereof in a mold press having a cover plate provided with a sealing pin for the bore in the member fixedly carried by said cover plate, said method comprising slidably mounting a snug-fitting bushing into the bore of said member at the end thereof which is to be covered having a portion of said bushing protruding beyond said end, placing said member and plastic material in said mould, supporting said member against axial movement in the mould and engaging said protruding end of the bushing by the sealing pin and sliding said bushing into the bore of the member by the sealing pin as the cover plate moves to close the mould.

2. The method of moulding a rubber flange on a tubular metal stem formed with a bearing surface in a mould having a cover plate provided with a sealing pin for the bore in the stem, said method comprising slidably mounting a snug-fitting bushing into the bore of the stem at the end thereof whereat the flange is to be formed having a portion of said bushing protruding beyond said end, placing said stem with a mass of rubber in a mould having a sealing shoulder for accommodating said bearing surface on the stem, and engaging said protruding end of the bushing by the sealing pin and sliding said bushing into the bore of the stem by said sealing pin as the cover plate moves to close the mould.

3. The method of insuring the sealing of the bore of a valve stem when moulding a rubber base flange on a valve stem which is slightly shorter than required for a particular mould cavity, in a mould having a movable cover plate, said method comprising increasing the initial effective length of the stem slightly beyond the length of a stem intended for accommodation by the particular mould cavity, by inserting into the bore of said stem at the end thereof whereat the rubber base flange is to be attached, a displaceable, snug-fitting bushing leaving a portion of said bushing protruding beyond said end, and engaging and moving said exposed end of the bushing into the stem by the mould cover plate as it moves to close the mould.

4. The method of forming a valve stem consisting of a rubber base flange attached to a hollow metal member, which comprises assembling in a mould having a movable cover plate, a tubular metal valve stem having a snugly fitting sleeve in and protruding from the bore of the tubular metal valve stem at the end thereof which is to be provided with the rubber base flange, together with a mass of rubber, and engaging said protruding end of the sleeve by the cover plate of the mould and forcing said sleeve into the bore of the valve stem by said cover plate as it moves to close the mould.

FRANK R. HORMANN.

References Cited in the file of this patent

UNITED STATES PATENTS

| Number | Name | Date |
| --- | --- | --- |
| 1,847,414 | Smith | Mar. 1, 1932 |
| 2,028,592 | Crowley | Jan. 21, 1936 |
| 2,135,569 | Ellis | Nov. 8, 1938 |
| 2,135,570 | Ellis | Nov. 8, 1938 |
| 2,145,218 | Broecker | Jan. 24, 1939 |
| 2,329,346 | Goff | Sept. 14, 1943 |